(12) United States Patent
Rothballer

(10) Patent No.: US 6,641,337 B1
(45) Date of Patent: Nov. 4, 2003

(54) CUTTING INSERT AND TOOL HAVING A CUTTING INSERT

(76) Inventor: Gerhard Rothballer, Zailach 11, D-91611 Lehrberg (DE)

( * ) Notice: Subject to any disclaimer, the term of this patent is extended or adjusted under 35 U.S.C. 154(b) by 0 days.

(21) Appl. No.: 09/868,012

(22) PCT Filed: Nov. 25, 1999

(86) PCT No.: PCT/DE99/03785
§ 371 (c)(1),
(2), (4) Date: Jun. 12, 2001

(87) PCT Pub. No.: WO00/37205
PCT Pub. Date: Jun. 29, 2000

(30) Foreign Application Priority Data

Dec. 18, 1998 (DE) .......................................... 298 22 553

(51) Int. Cl.[7] ............................ B32P 15/28; B26D 1/00; B26D 3/00
(52) U.S. Cl. ........................................ 407/114; 407/116
(58) Field of Search ....................... 407/114, 115, 407/116, 34, 35, 43, 53

(56) References Cited

U.S. PATENT DOCUMENTS

| 4,335,984 | A | | 6/1982 | Zweekly |
| 4,986,151 | A | | 1/1991 | Horn |
| 4,988,242 | A | * | 1/1991 | Pettersson et al. .......... 407/114 |
| 4,993,892 | A | * | 2/1991 | Takahashi .................... 407/114 |
| 5,011,340 | A | * | 4/1991 | Pettersson et al. .......... 407/114 |
| 5,044,840 | A | * | 9/1991 | Fouquer et al. ............. 407/114 |
| 5,116,167 | A | * | 5/1992 | Niebauer ..................... 407/114 |
| 5,743,681 | A | * | 4/1998 | Wiman et al. .............. 407/114 |
| 5,897,272 | A | * | 4/1999 | Wiman et al. .............. 407/114 |
| 6,079,912 | A | * | 6/2000 | Rothballer ................... 407/114 |
| 6,267,541 | B1 | * | 7/2001 | Isakov et al. ............... 407/114 |

FOREIGN PATENT DOCUMENTS

| DE | 91 10 831.4 | 12/1991 |
| DE | 197 03 569 A1 | 1/1997 |
| FR | 2 223 122 | 10/1974 |
| FR | 2 532 573 | 3/1984 |

* cited by examiner

Primary Examiner—Derris H. Banks
Assistant Examiner—Ali Abdelwahed

(57) ABSTRACT

A cutting insert suitable for the milling of gray cast iron has a cutting corner defined between two angularly adjoining cutting edges at junctions between a rake face formed on one of the sides and respective clearance faces extending between the sides, a spherically segmental indentation being formed in the rake face at the corner and intersecting the cutting edges with respective arcs where the cutting edges adjoin at the corner, the cutting edges being linear over stretches thereof extending away from the arcs.

11 Claims, 8 Drawing Sheets

CUTTING INSERT AND TOOL HAVING A CUTTING INSERT

CROSS REFERENCE TO RELATED APPLICATIONS

This application is a national stage of PCT/DE99/103785 filed Nov. 25, 1999 and based upon German application 298 22 553.0 filed Dec. 18, 1998 under the International Convention.

FIELD OF THE INVENTION

The invention relates to a cutting insert for the machining of workpieces, especially the roughing-finishing machining of gray cast iron by surface milling and wherein the rake surface is bounded by cutting edges of which two mutually-adjacent cutting edges form a cutting corner, the cutting insert having at least one trough-shaped indentation interrupting the cutting edges.

The invention relates further to a tool comprised of a tool holder with at least one recess for receiving such a cutting insert.

BACKGROUND OF THE INVENTION

Milling machining is generally carried out in two working steps, a premilling (roughing) and a fine milling. A combined roughing-finishing tool can be provided which has a part of the cutting inserts clamped in the recesses (seats) provided in the tool holder utilized as purely roughing tools and the remainder utilized as finishing tools. Examples for finishing cutting inserts are described in DE 197 03 569. The cutting inserts there described, which preferably have rake faces as regular hexagons, comprise a plurality of main cutting edges and auxiliary cutting edges connected thereto. As has been described in this publication, a cutting insert of that type can be used in combination with a cutting insert for roughing.

The cutting inserts described in DE 197 03 569 A1 have in conjunction with the auxiliary cutting edges a concave chip-forming groove whose radius is between 0.5 mm and 0.8 mm. With this chip-forming groove the cutting angle of the auxiliary cutter should be set between 10° and 20°. A chip-forming groove also extends along the main cutting edges and in cross section has a radius of curvature of 0.5mm measured in cross section. This publication does not describe purely roughing turning inserts.

A cutting insert is known from DE 28 40 610 C2 which has indentations in the rake face along the cutting edges and of a width whose greatest dimension is parallel to the cutting edges and which is greater than the distance between two neighboring indentations. Each of these indentations interrupts the cutting edge which here has a shape which changes in the region of the interruption, i.e. no longer forms a straight line, but rather in the region of the interruptions has a configuration rearwardly of the straight line cutting edge parts in the chip travel direction. Because of these features, buckling is produced in the chip travelling away from the cut which serves to break up the chip into short pieces. The region of the cutting corner should however be free from indentations and instead should have a planar rake surface portion or a negative consolidation surface to avoid an increase in the tendency toward buckling of the chip in the corner region. The mentioned indentations can, according to DE 28 40 610 C2, also be arranged in a chip-forming trough running along the cutting edge. In these publications a trigonally-shaped cutting insert is described which is unsuitable for rough milling operations.

U.S. Pat. No. 4,710,069 describes a cutting insert which has along its cutting edges a chamfer and in the region of the chamfer remote from the cutting edge, a groove-like recess. The boundary line between the mentioned chamfer and the groove-like recess is interrupted by a multiplicity of equally spaced recesses whose depths should be less than 0.1 mm. The recesses are substantially partially spherical recesses with a radius of curvature of 0.5 mm. Such cutting inserts are however only suitable for turning-type machining operations.

The shapes of roughing-finishing inserts which have been provided up to now have respective chip-forming troughs in conjunction with the cutting edges and extending over their entire lengths. In the region of a cutting edge corner, this chip-forming trough is interrupted by relatively higher lying stiffening surfaces. The roughing-finishing machining is however carried out with cutting depths of approximately 0.5 mm to 1 mm. Thus the rounded cutting corner effects cutting so that a modification of the chip-forming groove to increase the chip-forming angle does not yield any effective improvement. Moreover, a lengthening of a chip-forming groove in the cutting corner region while reducing the width of the stiffening surfaces readily reaches limits since remaining sharp edged projections, especially in the cutting corner region, tend to crumbling which significantly reduces the life of the cutting insert.

OBJECT OF THE INVENTION

It is thus an object of the present invention to provide a cutting insert for roughing-finishing and with which the axial forces arising in milling use are significantly reduced.

SUMMARY OF THE INVENTION

This object is achieved, according to the invention, by a cutting insert in which the indentations are arranged in the cutting-corner regions and interrupt both of the cutting edges which adjoin there.

In contrast to the teaching disclosed in DE 28 40 610 C2, to the effect that the cutting corner region should be left free from trough-like depressions or indentations, the cutting inserts formed according to the invention show significantly reduced cutting forces and a resulting improved life by comparison with the previous cutting inserts. Through the use of a spherical segmental recess in the cutting corner regions, significantly larger chip angles are permitted and for a cutting insert clamped in a tool holder greater effective radial and axial chip angles can be realized. The cutting edges which are linear except in the cutting corner regions are, as a result of the indentations, concavely curved at their rear parts in the direction of the cutting corners and the cutting corners lie approximately at the height or level of the linearly running cutting edge or slightly therebelow. This is repeated in a corresponding manner whereever the cutting edges adjoin the cutting corners. The cutting insert is used in milling in that preferably the cutting edge portions falling away in a concave manner at both sides of the cutting corners are effective for cutting purposes. The maximum width of the indentations in the cutting corner region depends upon the desired cutting depth. In the region of the cutting corner which is effective for the cutting operation, a trough can be formed which allows the positive cutting angle to be optionally selected.

Preferably the indentations are symmetrical to the angle bisectors of the cutting corners.

According to a further feature of the invention, the indentations are formed in part as spherically segmental, whereby the radius of curvature of the concave indentations lies between 4 mm and 10 mm. The maximum depth of the indentations should preferably not be greater than 0.4 mm to 0.6 mm.

Since the cutting corners should only be used to an effective cutting depth of 0.5 mm to 1 mm, the maximum diameter of the indentation should be 4 mm.

To maintain a sufficient cutting corner stability, the cutting angle γ should lie between +5° and +20° in the cutting corner region, preferably between +8° and +15°.

So that the cutting insert can be used not only on one side but also on the top surface as well as the bottom surface, a central rake face plateau can be provided for two-sided support, the cutting edge planes projecting over the rake surface plateau. The intermediate cutting surface plateau has, according to a further feature of the invention, nose-shaped projections which extend into the rearward region of the indentations.

Preferably the cutting inserts of the invention are of regular six-corner form in which the respective mutually adjacent cutting edges are oriented at an obtuse angle of 120°. The cutting edges are rounded so that, according to a feature of the invention, the cutting corner rounding has a radius between 0.4 mm and 3 mm. As has already been indicated, the cutting insert is configured to be useful on both sides so that twelve usable cutting corners are provided for machining.

The cutting insert according to the invention is preferably received in a recess or seat provided therefor in a tool holder configured as a milling tool body and are fastened in the recess. For fastening, clamping wedges can be used for fixing the cutting insert with respect to the tool axis. It is, however, also possible to arrange the cutting inserts in cassettes which can then be affixed in the tool carrier in the desired orientations. According to the invention, an orientation of the cutting insert for roughing is selected in which it has an effective axial cutting angle $\gamma_p$ of +5° to +10° and/or an effective radial cutting angle of 0° to +8° in the cutting insert recess.

BRIEF DESCRIPTION OF THE DRAWING

An embodiment of the invention is shown in the drawing. In the drawing.

Figure 1:
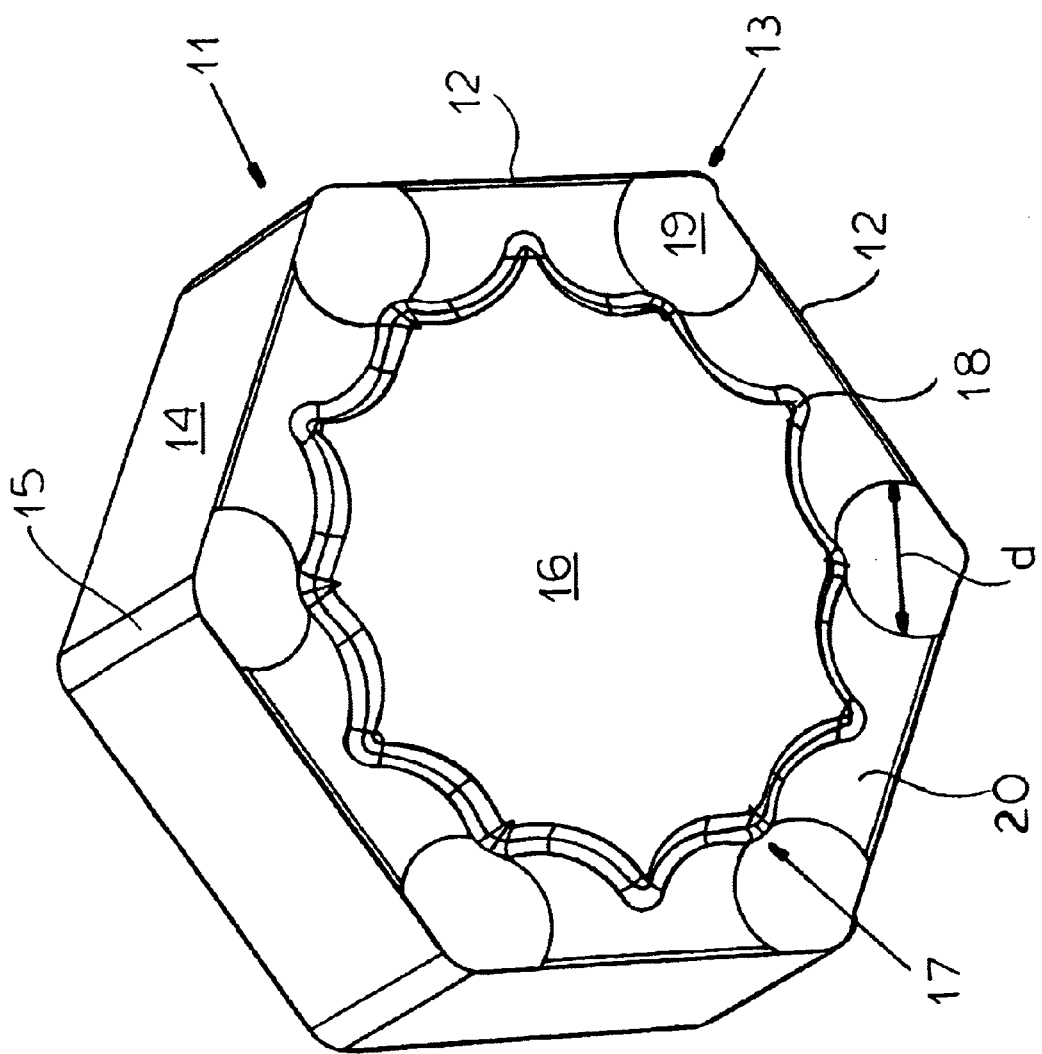
FIG. 1 is a perspective view of a turning cutting plate according to the invention as seen from the front.
Figure 2:
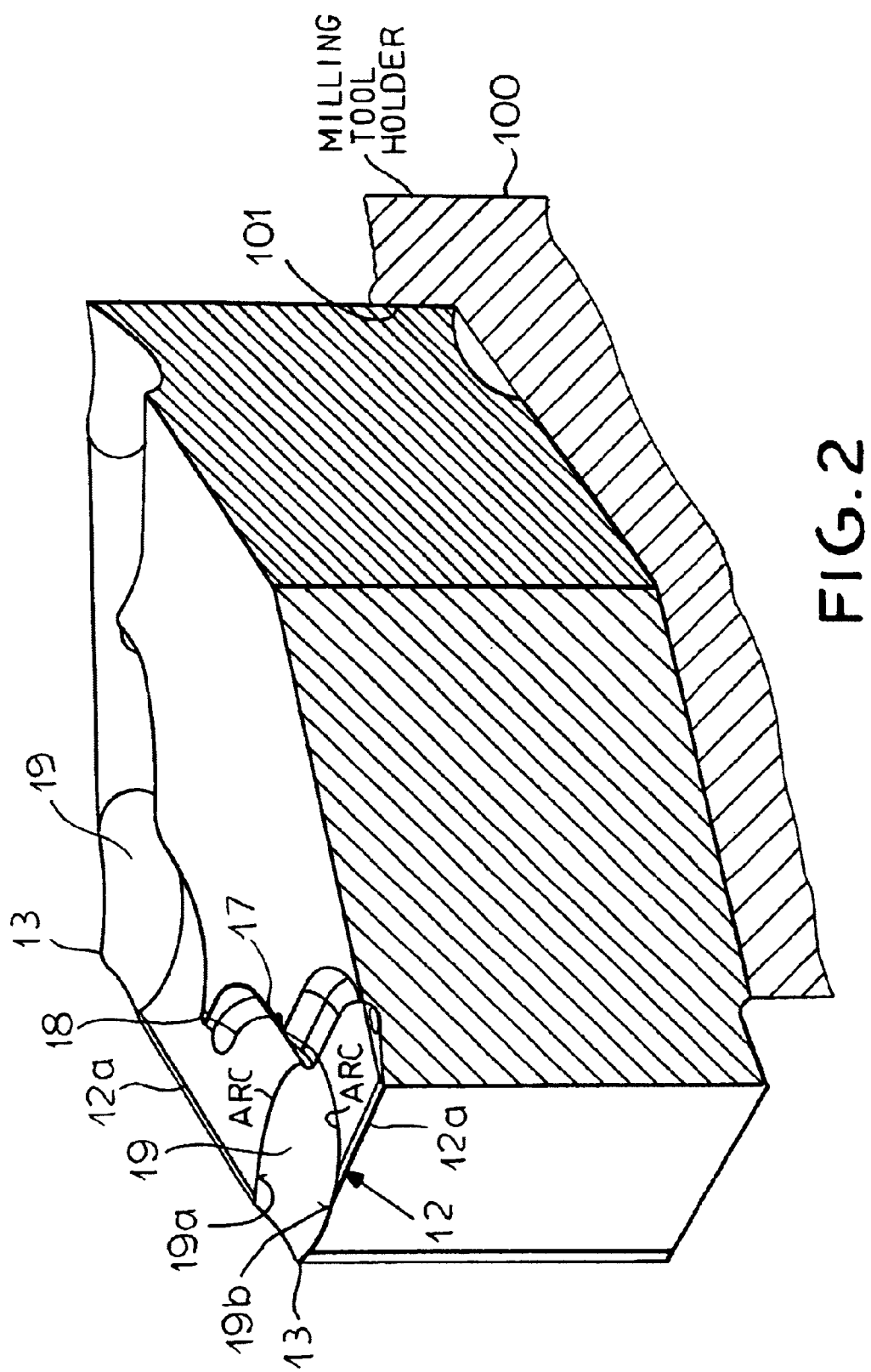
FIG. 2 is a partial perspective section through this turning cutting plate.
Figure 3:
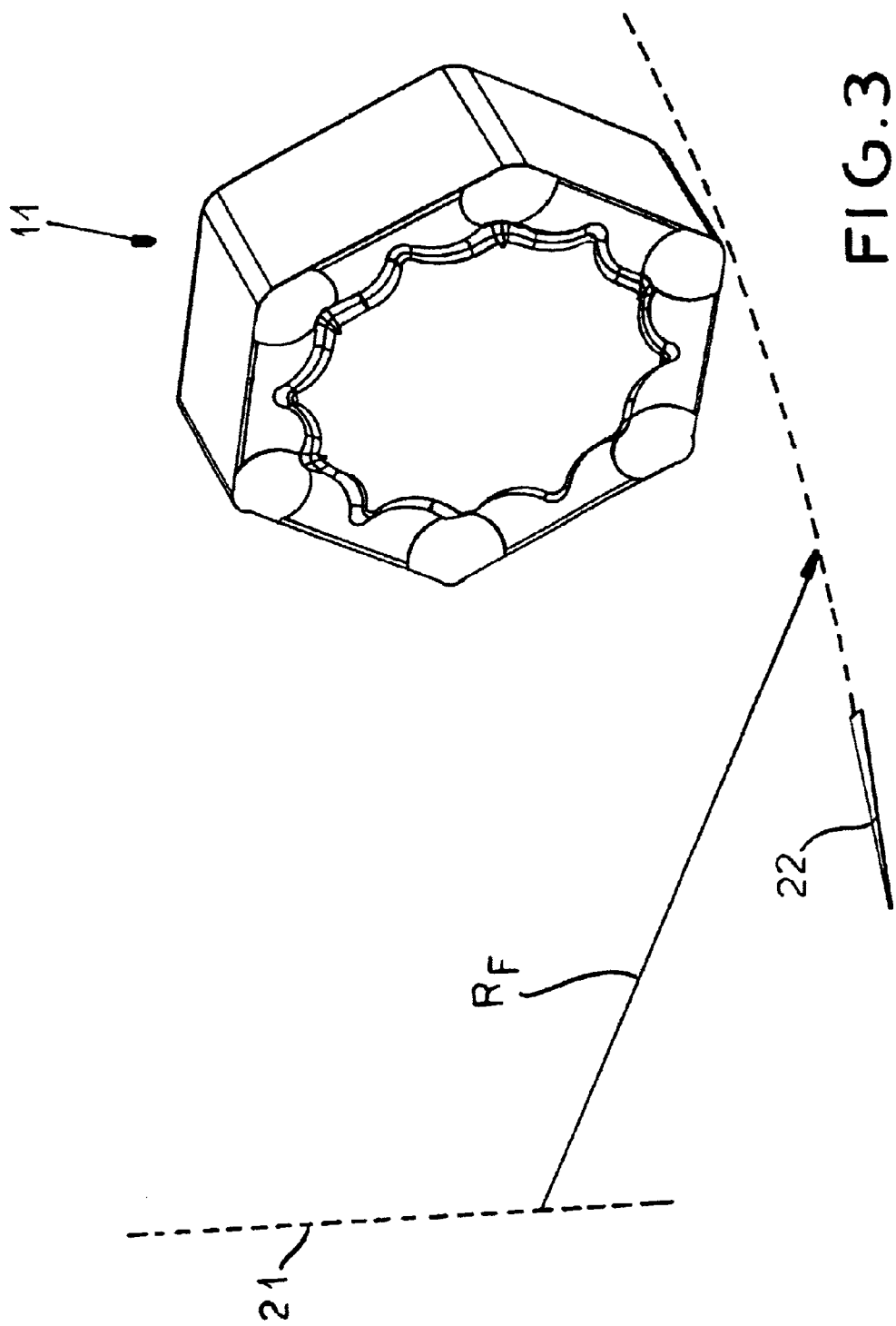
FIG. 3 is a perspective view of a turning cutting plate with respect to its mounted orientation.
Figure 6:
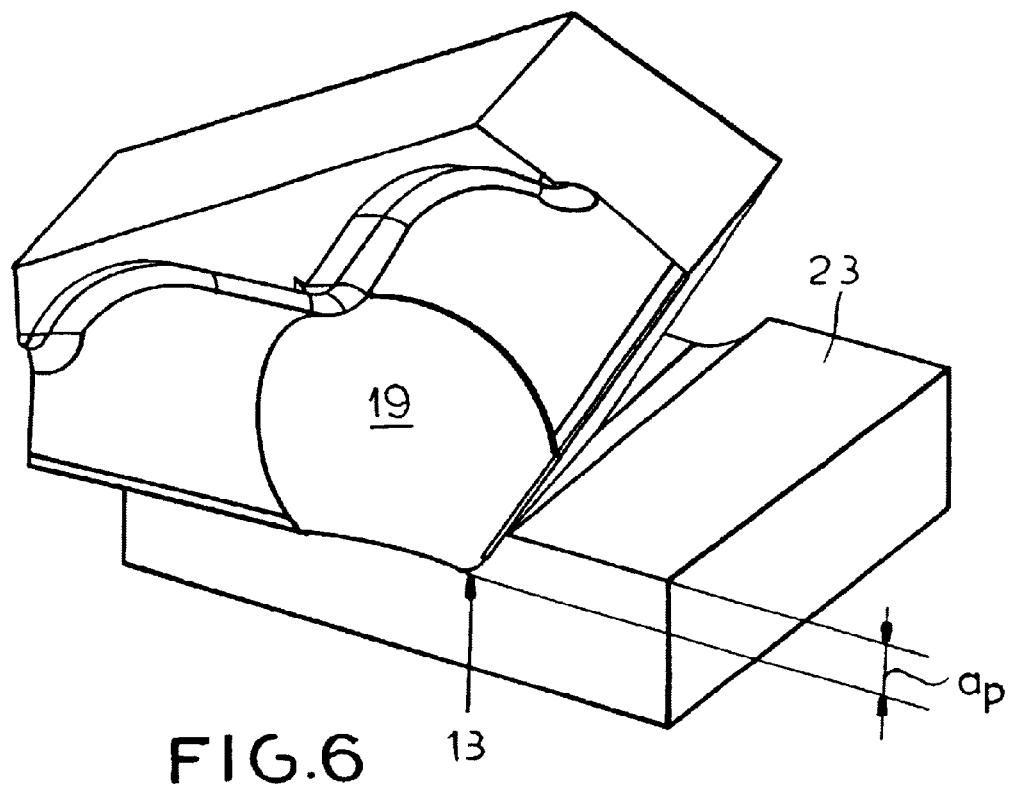
FIG. 6 is a view similar to FIG. 5 for a milling insert.

The cutting insert 11 shown in the drawing is comprised of a regular six-cornered rake surface which is bounded by six cutting edges 12 of which two mutually adjacent cutting edges 12 form a cutting corner 13. The cutting corners 13 are rounded such that the cutting edges have respective planar clearance faces 14 and the corners adjoin rounded clearance face segments 15. On the rake face the cutting insert has a central rake face plateuu 16 which is star-shaped and has respective nose-shaped projections 17 projecting in the direction of the cutting corners. Between two cutting corners, further projections 18 are arranged which are oriented approximately at the center of the respective cutting edges 12. The cutting insert 11 comprises, according to the invention, spherically segmental indentations 19 in each cutting corner on the rake face. The indentation 19 intersects the cutting edges 12 with respective arcs 19a, 19b where the cutting edges adjoin at the respective corner (FIG. 2). A chip-forming groove 20 runs parallel to each of the cutting edges 12 except in the regions of the spherically segmental indentations 19. The cutting edges have linear stretches 12a extending away from the indentation 19. As can be deduced expecially from FIG. 1, the nose-shaped projections 17 and 18 are each comprised of a lower concave part and an upper convex part. The projections can, however, comprise planar descending flanks or convex or concave flanks. The cutting insert has a thickness of, for example, 5.56 mm and an inscribed circle diameter of 16.2 mm. The cutting insert which is configured to be double-sided is preferably used for milling in a tool holder 100 (FIG. 2) which rotates about the rotation axis 21 (FIG. 3). The cutting insert 11 travels along the milling radius $R_f$ so that the cutting insert is moved in the direction of the arrow 22 along with other rough cutting inserts. The machining operation which is carried out is shown in greater detail in FIG. 6. The workpiece 23 is machined with an end surface miller with a cutting depth $a_p$, whereby a plurality of roughing cutting inserts come into play.

Figure 4:
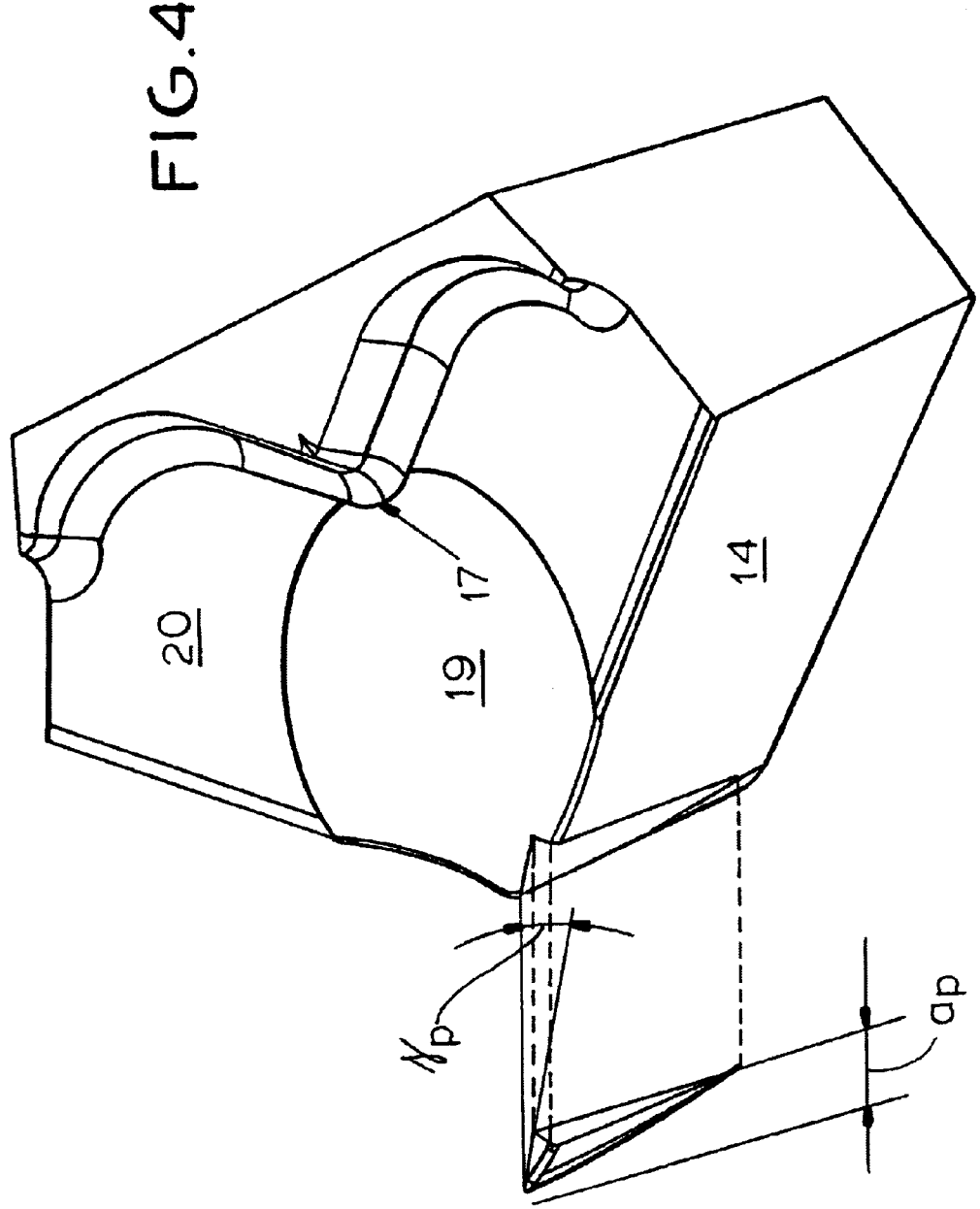
FIGS. 4 and 5 are partial perspective views of the turning plate according to the invention for showing the cutting angle in the corner region.
Figure 5:
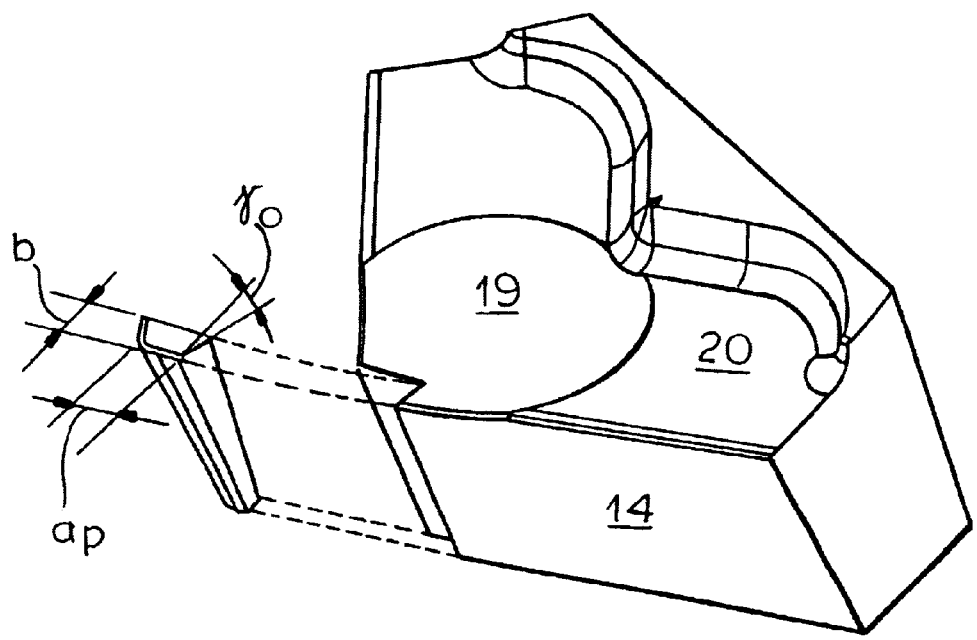

In this milling operation a positive axial cutting angle $\gamma_p$ is provided via the aforedescribed segmental configuration (see FIG. 4). FIG. 5 shows a cutting angle $\gamma_0$, referring to a cutting depth $a_p$ of for example 10.5 mm at a distance b of about 0.5 mm from the cutting edge over a length which corresponds approximately to the selected 0.5 mm tooth feed.

Figure 7:
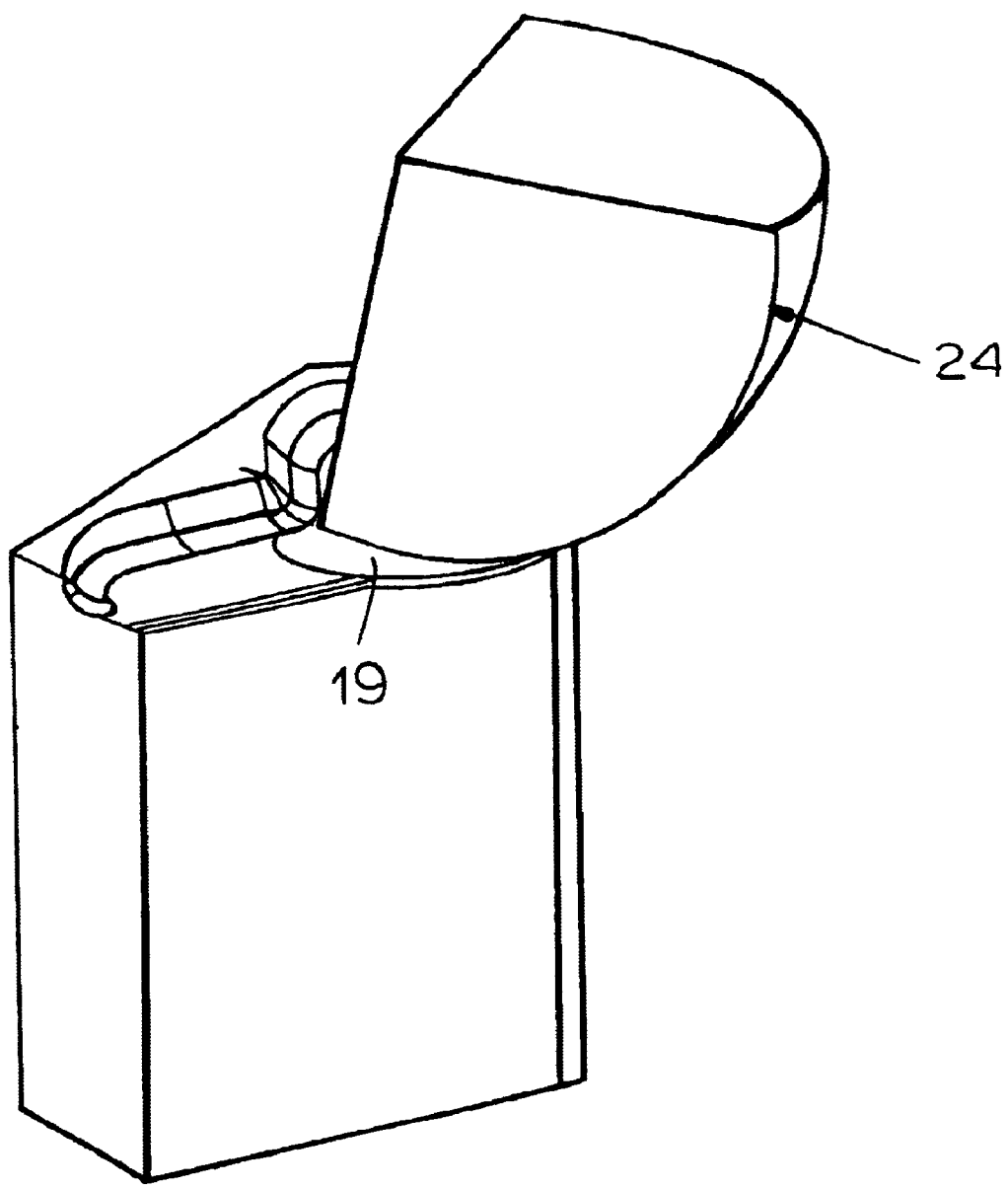
FIGS. 7 and 8 are fragmentary perspective views of a cutting corner region for illustrating the spherical segmental configuration and orientation.
Figure 8:
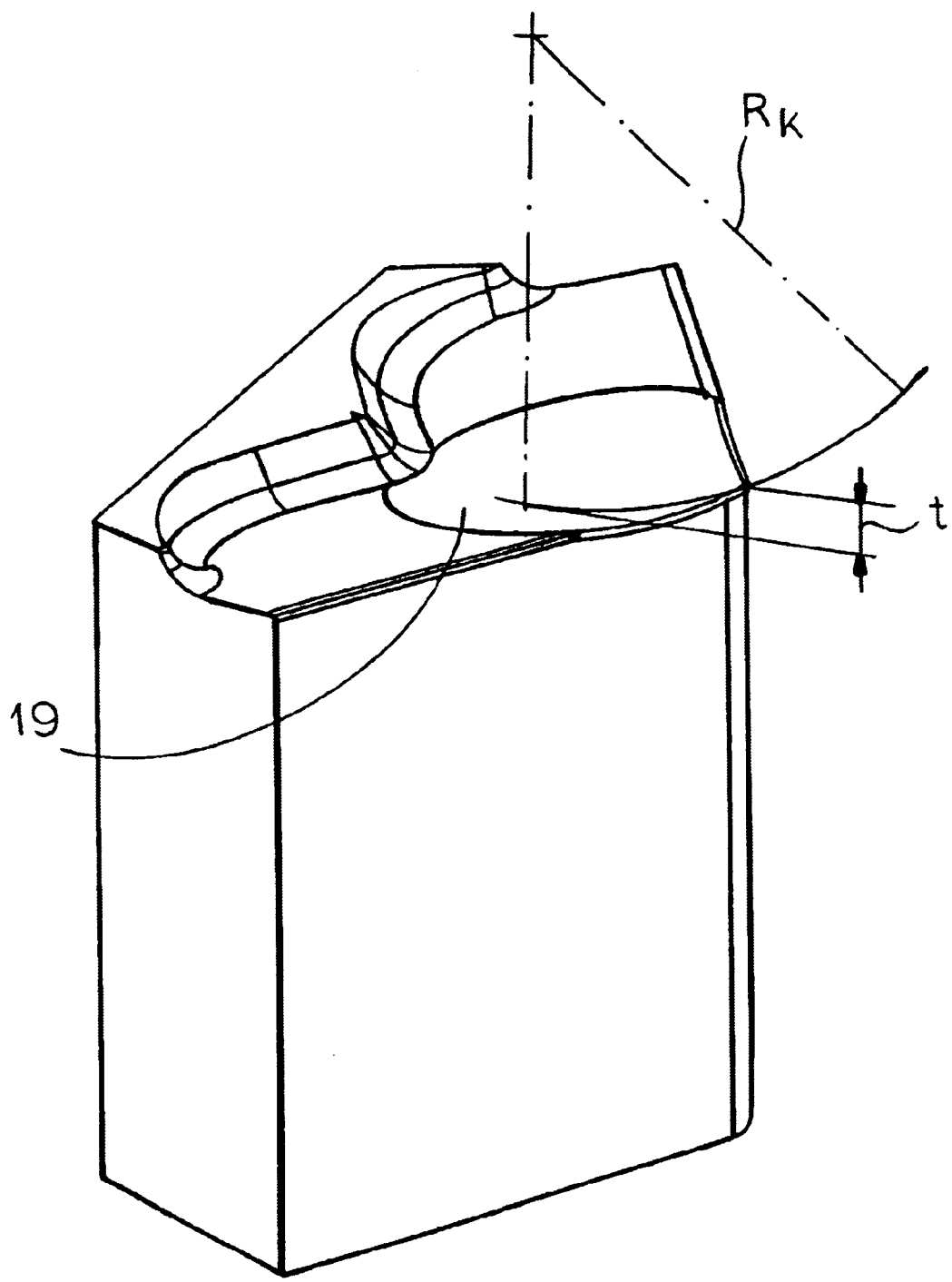

From FIG. 7 it will be clear that the indentation 19 forms a spherical segment. The sphere or partial sphere 24 can be seen from FIG. 7.

The corresponding spherical radius $R_k$ lies between 4 mm and 10 mm and the maximum segment depth t has a value between 0.4 mm to 0.6 mm.

Figure 9:
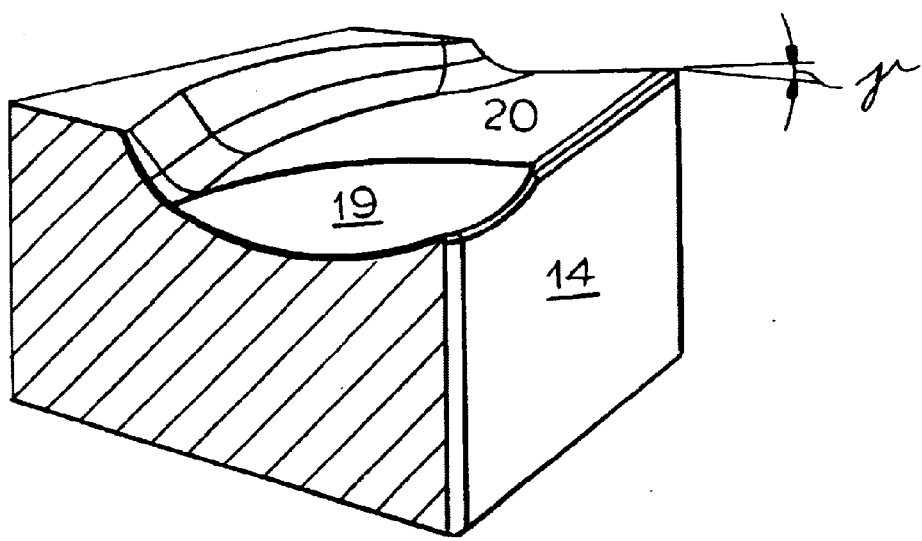
FIG. 9 is a fragmentary perspective view of the cutting corner to show the cutting corner cutting angle γ at the rake surface.
Figure 10:
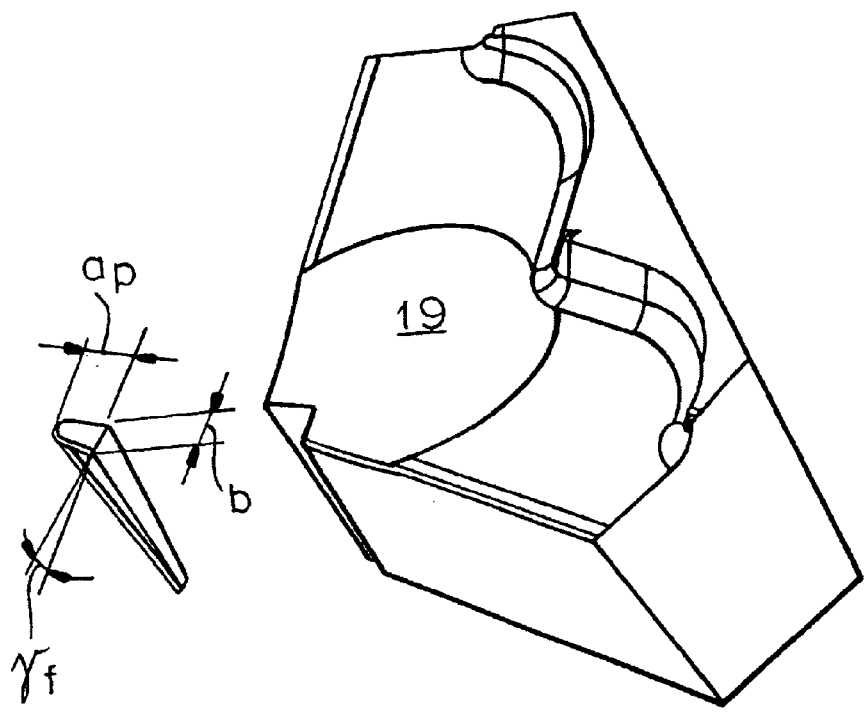
FIG. 10 is a fragmentary perspective view for illustrating the radial cutting angle.

FIG. 9 shows the cutting angle or rake angle γ at which the rake surface region bounding the straight line part of the cutting edge 12 is inclined. The radial rake angle $\gamma_f$ which is given by the mounting of the cutting insert in the tool holder is shown in FIG. 10.

A mill provided with cutting inserts 11 is used for the cutting of a workpiece 23. By contrast to the conventional six-cornered turning cutting plates of the state of the art, there is a reduction in the passive force of about 40%.

What is claimed is:

1. A cutting insert suitable for the milling of gray cast iron, comprising a generally flat cutting-insert body of polygonal shape and opposite sides, said body being formed along at least one of said sides with a cutting corner defined between two angularly adjoining cutting edges at junctions between a rake face formed on said one of said sides and respective clearance faces extending between said sides, a spherically segmental indentation being formed in said rake face at said corner and intersecting said cutting edges with respective arcs where said cutting edges adjoin at said corner, said cutting edges being linear over stretches thereof extending away from said arcs.

2. The cutting insert according to claim 1 wherein the indentation is symmetrical with respect to a cutting corner angle bisector.

3. The cutting insert according to claim 2 wherein the indentation has a radius of curvature (RF) between 4 mm and 10 mm and a depth of 0.4 to 0.6 mm.

4. The cutting insert according to claim 3 wherein said indentation has a diameter (d) of a maximum of 4 mm.

5. The cutting insert according to claim 4 wherein said rake surface forms a rake angle between +5° and +20° at the cutting corner.

6. The cutting insert defined in claim 5 wherein said rake angle is +8° and +15°.

7. The cutting insert according to claim 5 wherein said one of said 'sides has a central rake surface plateau and plurality of said cutting corners at vertices of a regular polygon, said plateau being formed by a ridge formed with nose-shaped projections rearwardly of the indentations of said corners.

8. The cutting insert according to claim 7, wherein said body has a regular six-corner shape.

9. The cutting insert according to claim 8 wherein the cutting corners are rounded with a radius between 0.4 mm and 3 mm.

10. A tool comprised of a tool holder with at least one recess for receiving a cutting insert according to claim 9 and wherein the cutting insert is arranged with an effective axial cutting angle of +5° to +10°.

11. A cutting tool comprising a milling tool holder having at least one cutting-insert recess, and a cutting insert in said recess comprising a generally flat cutting-insert body of polygonal shape and opposite sides, said body being formed along at least one of said sides with a cutting corner defined between two angularly adjoining cutting edges at junctions between a rake face formed on said one of said sides and respective clearance faces extending between said sides, a spherically segmental indentation being formed in said rake face at said corner and intersecting said cutting edges with respective arcs where said cutting edges adjoin at said corner, said cutting edges being linear over stretches thereof extending away from said arcs.

* * * * *